United States Patent
Atia et al.

(10) Patent No.: US 9,577,571 B2
(45) Date of Patent: Feb. 21, 2017

(54) SOLAR PANEL MOUNTING APPARATUS WITH ENHANCED STRENGTH

(71) Applicants: Moti Atia, North Hollywood, CA (US); Natanel Levi, North Hollywood, CA (US)

(72) Inventors: Moti Atia, North Hollywood, CA (US); Natanel Levi, North Hollywood, CA (US)

(*) Notice: Subject to any disclaimer, the term of this patent is extended or adjusted under 35 U.S.C. 154(b) by 0 days.

(21) Appl. No.: 14/690,122

(22) Filed: Apr. 17, 2015

(65) Prior Publication Data

US 2016/0308486 A1 Oct. 20, 2016

(51) Int. Cl.
*H02S 20/23* (2014.01)
*H02S 20/30* (2014.01)
*E04D 13/00* (2006.01)
*F24J 2/52* (2006.01)
*H02S 20/24* (2014.01)

(52) U.S. Cl.
CPC .............. *H02S 20/23* (2014.12); *E04D 13/00* (2013.01); *F24J 2/52* (2013.01); *H02S 20/24* (2014.12)

(58) Field of Classification Search
CPC .... E04D 11/005; E04D 11/007; E04D 3/3602; E04D 3/3603; E04D 3/3605; E04D 13/00; E04D 3/3606; E04D 3/36; E04D 3/3601; H02S 20/30; H02S 20/23; H02S 20/24; H02S 30/00; H02S 30/10
USPC ......... 52/173.3; 136/251, 244, 245; 126/623
See application file for complete search history.

(56) References Cited

U.S. PATENT DOCUMENTS

| | | | | |
|---|---|---|---|---|
| 3,371,454 A * | 3/1968 | Anderson | ............ | E04B 2/7424 52/126.4 |
| 3,529,274 A * | 9/1970 | Routh | ..................... | F21V 21/35 439/118 |
| 4,485,597 A * | 12/1984 | Worrallo | ............... | F16B 7/0473 403/255 |
| 8,128,044 B2 * | 3/2012 | Liebendorfer | ......... | F24J 2/5205 136/244 |
| 8,387,319 B1 * | 3/2013 | Gilles-Gagnon | ...... | F24J 2/5205 52/173.3 |
| 8,595,997 B2 * | 12/2013 | Wu | ........................ | F24J 2/5205 136/244 |
| 8,695,290 B1 * | 4/2014 | Kim | ...................... | F24J 2/5252 248/225.11 |
| 8,984,751 B2 * | 3/2015 | Ramos | ................... | F24J 2/5205 29/525.01 |
| 9,249,994 B2 * | 2/2016 | Zuritis | .................. | F24J 2/5207 |

(Continued)

*Primary Examiner* — Phi A
(74) *Attorney, Agent, or Firm* — Plager Schack LLP

(57) ABSTRACT

A solar panel mounting apparatus for use in securing a frame with a solar panel stored therein to a roof of a building includes a non-hollow member with a lower cross-sectional profile and enhanced strength. The apparatus includes a rail coupled to the frame and the roof, the rail having a cross-sectional profile comprising an upper cavity, a first side cavity, a second side cavity and a third side cavity, a first set of fasteners coupled to the frame and the upper cavity, and a second set of fasteners coupled to the roof and the first side cavity or the second side cavity. The upper cavity has a substantially pentagonal cross-sectional shape, the first side cavity has a substantially rectangular cross-sectional shape, the second side cavity has a substantially rectangular cross-sectional shape, and the third side cavity has a substantially trapezoidal cross-sectional shape.

7 Claims, 4 Drawing Sheets

(56) References Cited

U.S. PATENT DOCUMENTS

| | | | |
|---|---|---|---|
| 2006/0156651 A1* | 7/2006 | Genschorek | F24J 2/045 52/200 |
| 2009/0019796 A1* | 1/2009 | Liebendorfer | F24J 2/5207 52/173.3 |
| 2010/0132693 A1* | 6/2010 | Schnitzer | F24J 2/5203 126/623 |
| 2010/0263297 A1* | 10/2010 | Liebendorfer | F24J 2/5207 52/11 |
| 2011/0126881 A1* | 6/2011 | Hong | F24J 2/5205 136/244 |
| 2011/0179727 A1* | 7/2011 | Liu | F24J 2/5203 52/173.3 |
| 2011/0239546 A1* | 10/2011 | Tsuzuki | F24J 2/4614 52/11 |
| 2011/0302857 A1* | 12/2011 | McClellan | E04D 13/0445 52/173.3 |
| 2013/0055662 A1* | 3/2013 | Gilles-Gagnon | F24J 2/5205 52/173.3 |

* cited by examiner

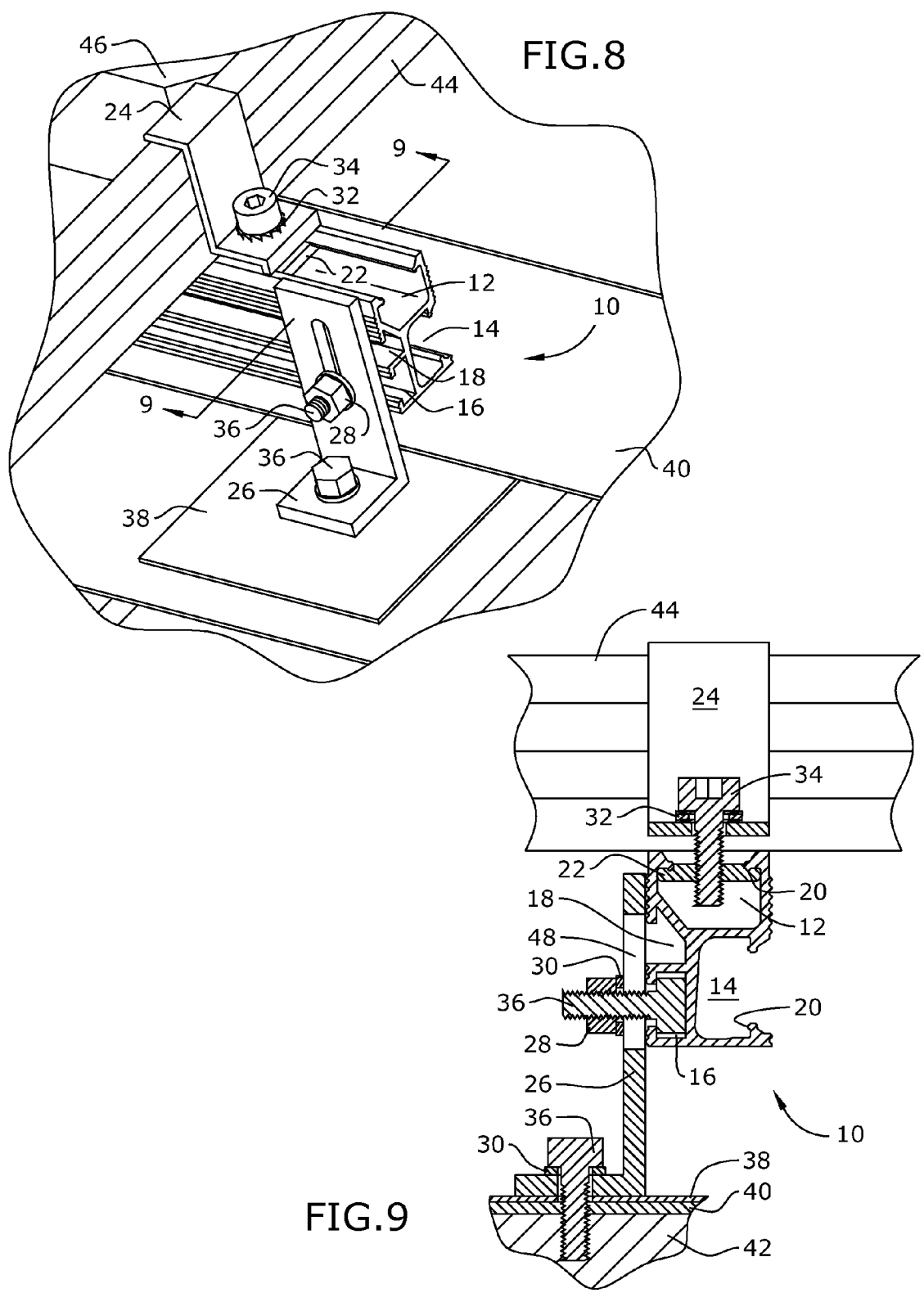

SOLAR PANEL MOUNTING APPARATUS WITH ENHANCED STRENGTH

BACKGROUND

The embodiments herein relate generally to solar panel mounting devices used with buildings.

As environmental concerns increase and carbon emissions continue to become an issue, individuals are turning to green technologies and alternative power sources. Solar technologies used to generate power for buildings continue to increase in popularity and use. In these applications, solar panels are typically mounted on the roof of a building or alternative structure to capture sunlight. The sunlight is converted into electricity, which is used to charge a set of batteries. The batteries provide electrical power to users of the building or alternative structure.

Currently, a variety of mounting devices are used to secure solar panels to the building roof. These mounting devices generally include rails secured to the roof and the solar panel. Typically, each rail has a hollow inner chamber to increase the strength of the mounting device. However, these rails are limited because they include a relatively high cross-sectional profile, which elevates the solar panel above the roof, thereby making the solar panel assembly on the roof less aesthetically pleasing.

As such, there is a need in the industry for a solar panel mounting apparatus that comprises a lower cross-sectional profile and enhanced strength without the use of a hollow chamber member.

SUMMARY

A solar panel mounting apparatus for use in securing a frame with a solar panel stored therein to a roof of a building is provided. The solar panel mounting apparatus comprises a non-hollow member with a lower cross-sectional profile and enhanced strength. The solar panel mounting apparatus comprises a rail detachably coupled to the frame and the roof, the rail comprising a cross-sectional profile comprising an upper cavity, a first side cavity, a second side cavity and a third side cavity, a first set of fasteners coupled to the frame and a portion of an inner wall of the upper cavity, and a second set of fasteners coupled to the roof and a portion of an inner wall of the first side cavity or a portion of the inner wall of the second side cavity. In one embodiment of the invention, the upper cavity comprises a substantially pentagonal cross-sectional shape, the first side cavity comprises a substantially rectangular cross-sectional shape, the second side cavity comprises a substantially rectangular cross-sectional shape, and the third side cavity comprises a substantially trapezoidal cross-sectional shape.

BRIEF DESCRIPTION OF THE FIGURES

The detailed description of some embodiments of the invention will be made below with reference to the accompanying figures, wherein the figures disclose one or more embodiments of the present invention.

FIG. 8 depicts a perspective view of an alternative embodiment of the solar panel mounting apparatus shown in use; and FIG. 9 depicts a section view of the alternative embodiment of the solar panel mounting apparatus taken along line 9-9 in FIG. 8.

DETAILED DESCRIPTION OF CERTAIN EMBODIMENTS

Figure 1:
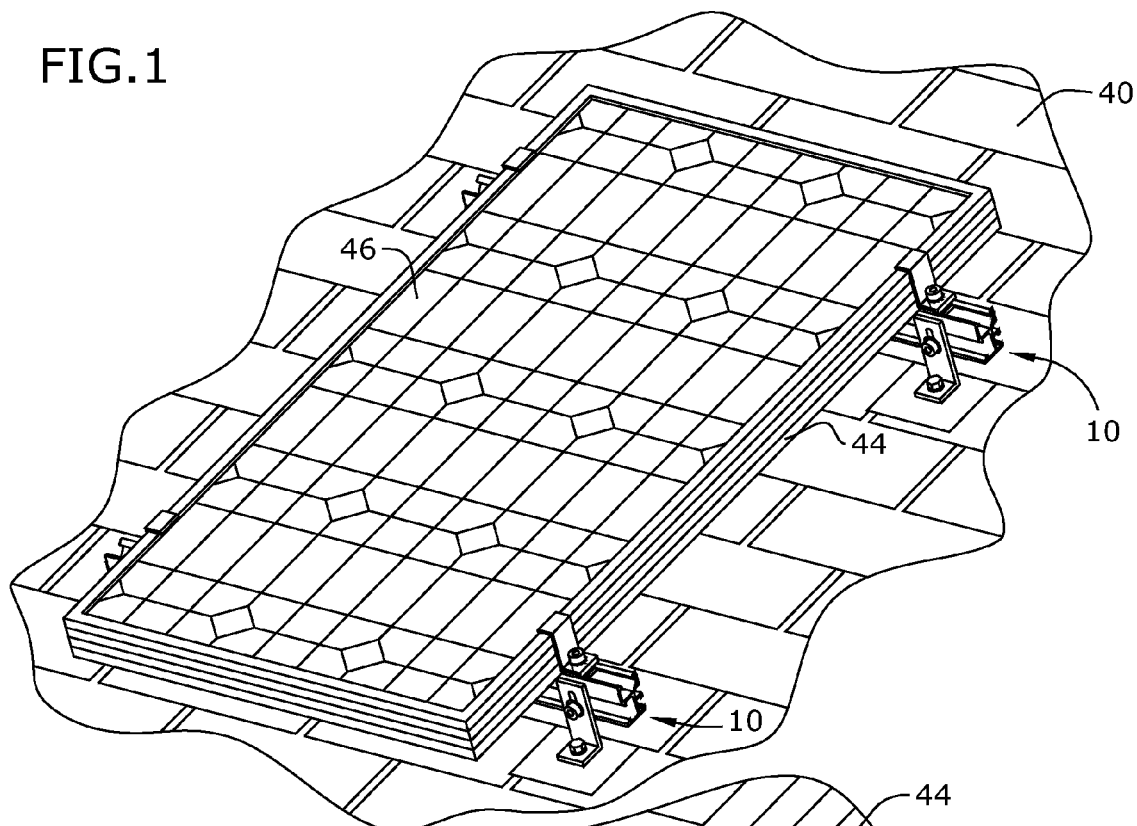
FIG. 1 depicts a perspective view of certain embodiments of the solar panel mounting apparatus shown in use.
Figure 2:
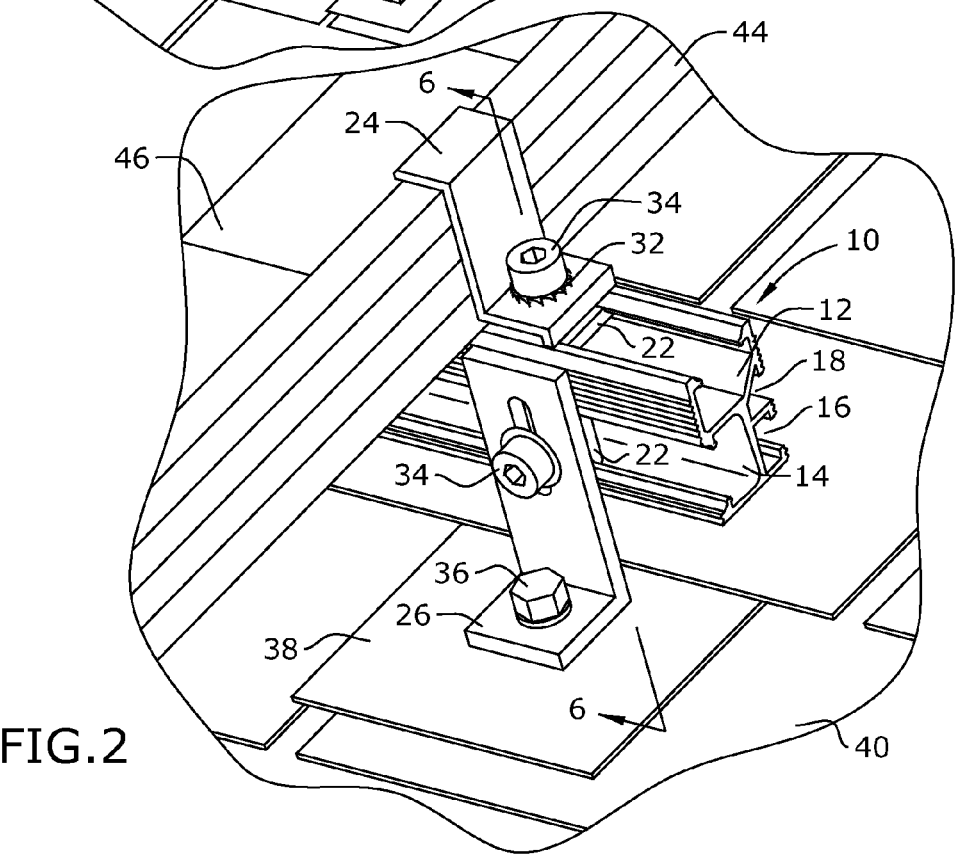
FIG. 2 depicts a perspective view of certain embodiments of the solar panel mounting apparatus shown in use.

As depicted in FIGS. 1-2, the solar panel mounting apparatus comprises rails 10 configured to secure solar panel 46 within solar panel frame 44 to roofing shingles 40. It shall be appreciated that different types of solar panels 46 and solar panel frames 44 may be used with the mounting apparatus. In addition, the solar panel mounting apparatus may be used with a variety of roofs including, but not limited to, composition shingle roofs, flat tile roofs, S-style roofs, or the like.

Typically, a pair of rails 10 is used to secure solar panel frame 44 to roofing shingles 40. Fasteners including Z-bracket 24, socket screw 34 and star washer 32 are used to secure solar panel frame 44 to each rail 10. Fasteners including L-bracket 26, washers 30, socket screw 34, hex bolt 36 and brace plate 38 are used to secure each rail 10 to roofing shingles 40. The fasteners are preferably made from stainless steel. However, alternative materials or combination of materials may be used instead. Hex bolt 36 is preferably a ⅜" bolt. However, alternative sized bolts may be used instead. It shall be appreciated that alternative fasteners such as brackets may be used. For example, a T-bracket may be used instead of Z-bracket 24.

Figure 3:
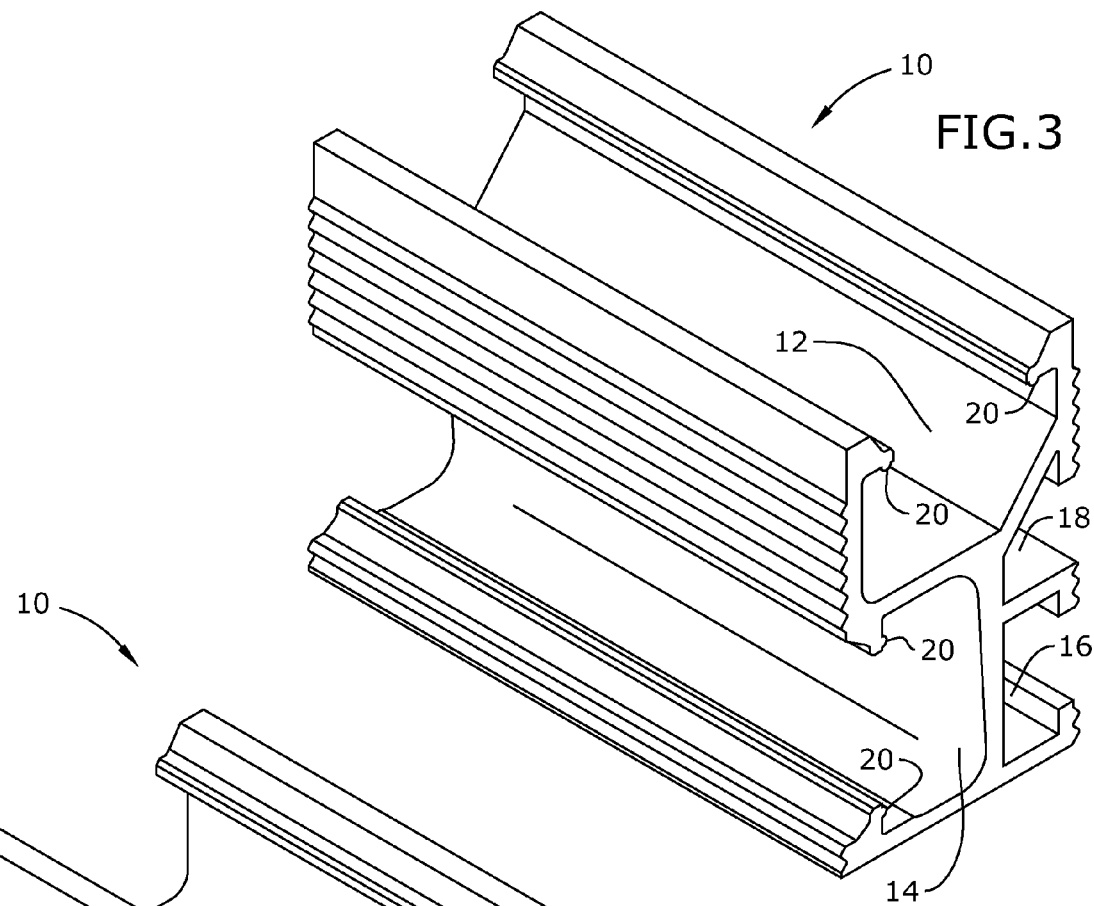
FIG. 3 depicts a left perspective view of certain embodiments of the solar panel mounting apparatus.
Figure 4:
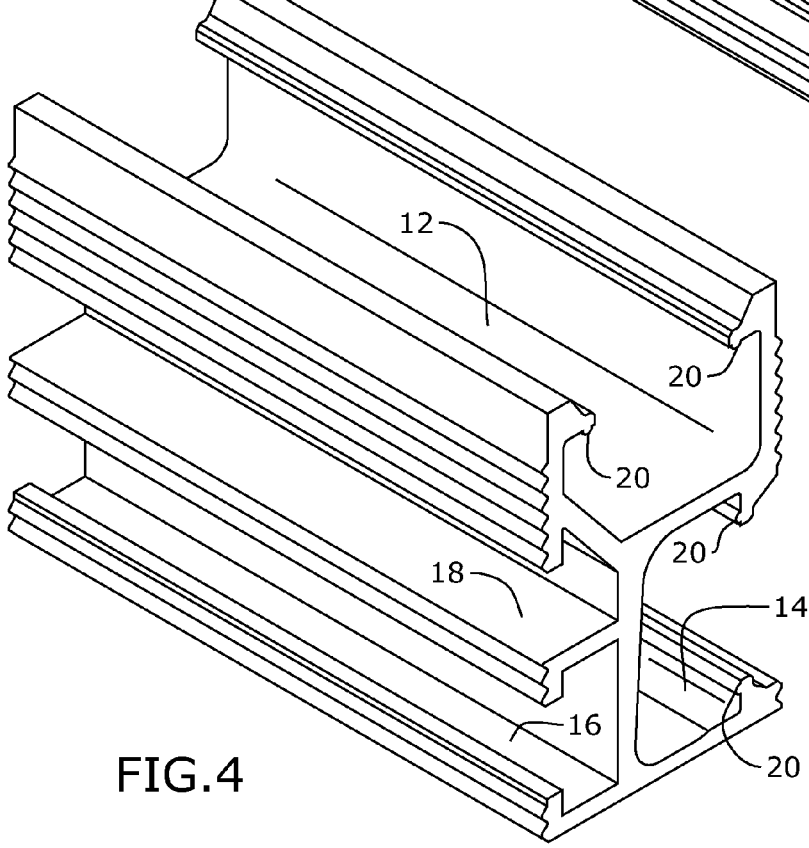
FIG. 4 depicts a right perspective view of certain embodiments of the solar panel mounting apparatus.
Figure 5:
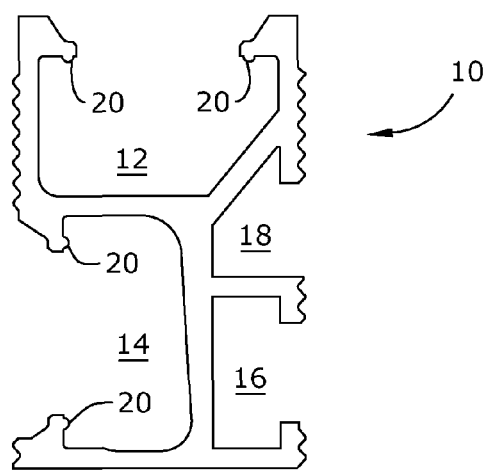
FIG. 5 depicts a front view of certain embodiments of the solar panel mounting apparatus.

As depicted in FIGS. 3-5, rail 10 preferably is made from aluminum and comprises a plurality of cavities such as upper cavity 12, first side cavity 14, second side cavity 16 and third side cavity 18. In a preferred embodiment, upper cavity 12 comprises a substantially pentagonal cross-sectional shape, first side cavity 14 has a substantially rectangular cross-sectional shape, second side cavity 16 has a substantially rectangular cross-sectional shape, and third side cavity 18 has a substantially trapezoidal cross-sectional shape.

A first pair of brace latch knobs 20 is disposed on the inner wall of upper cavity 12. Similarly, a second pair of brace latch knobs 20 is disposed on the inner wall of first side cavity 14. Brace latch knobs 20 are designed to contact lock braces 22 when fastening rail 10 to solar panel frame 44 and roofing shingle 40. It shall be appreciated that multiple rails 10 can be aligned and secured together by inserting fasteners (not shown) in corresponding cavities of adjacent rails 10. This permits a user to create a rail assembly comprising multiple adjacent rails 10 aligned together and having a sufficient length that extends beneath solar panel 46 and solar panel frame 44.

Figure 6:
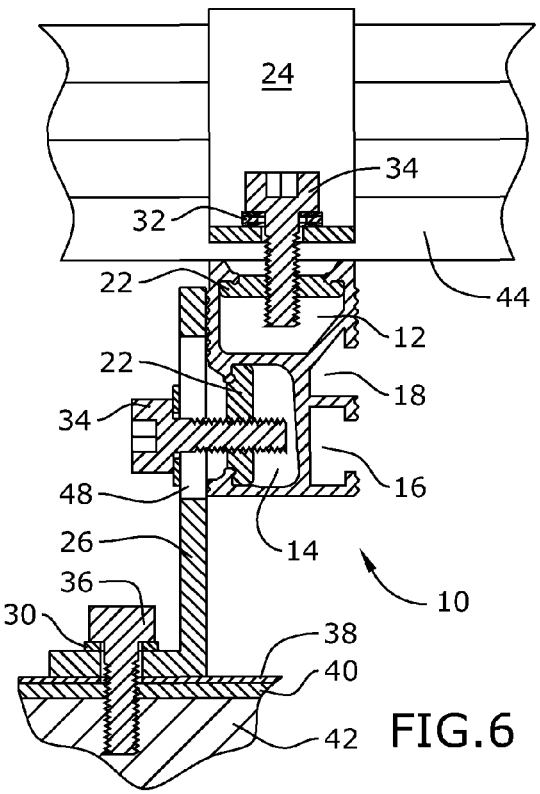
FIG. 6 depicts a section view of certain embodiments of the solar panel mounting apparatus taken along line 6-6 in FIG. 2.
Figure 7:
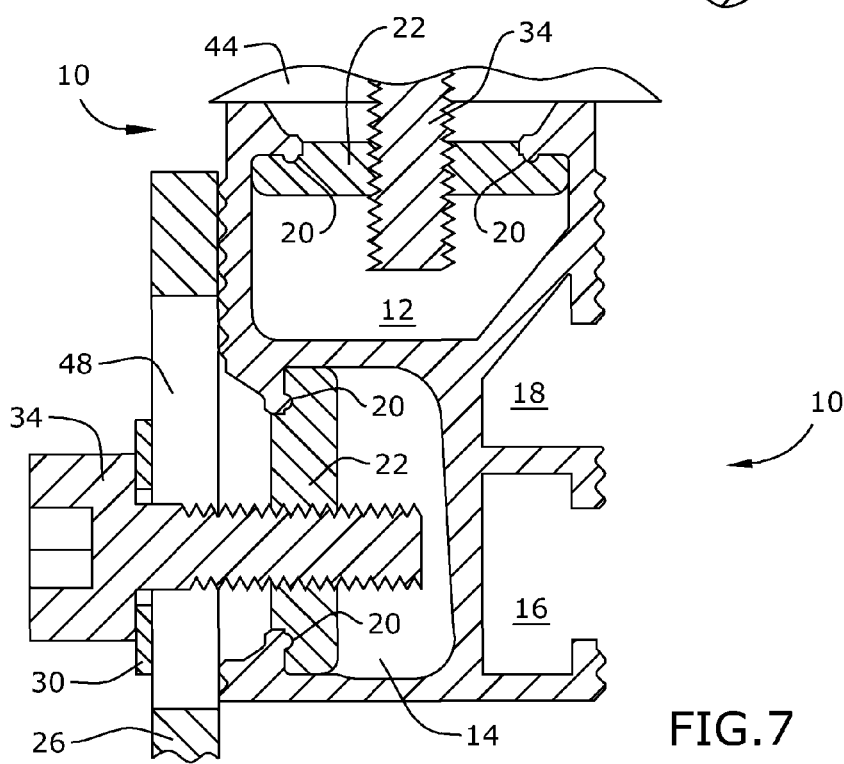
FIG. 7 depicts a section view of certain embodiments of the solar panel mounting apparatus.

In operation, the solar panel mounting apparatus is used to secure solar panel 46 and solar panel frame 44 to roofing shingles 40. Z-bracket 24 has an upper portion coupled to solar panel frame 44 and a lower portion coupled to the interior wall of upper cavity 12. As depicted in FIGS. 6-7, Z-bracket 24 comprises a lower portion with a threaded opening. A first lock brace 22 comprising a threaded opening is disposed within upper cavity 12 and placed against brace latch knobs 20. Star washer 32 is disposed on top of the threaded opening in Z-bracket 24 and socket screw 34 is inserted through star washer 32, the threaded opening in Z-bracket 24 and the threaded opening in the first lock brace 22. It shall be appreciated that star washer 32 improves the electrical grounding of solar panel 46.

Rail 10 is secured to roofing shingle 40 by using L-bracket 26. L-bracket 26 comprises an upper portion with adjustment slot 48 and a lower portion with an opening. A second lock brace 22 comprising a threaded opening is disposed within first side cavity 14 and placed against brace latch knobs 20. Washer 30 is placed on L-bracket 26 proximate adjustment slot 48 and socket screw 34 is inserted through washer 30, adjustment slot 48 in L-bracket 26 and the threaded opening in the second lock brace 22. It shall be appreciated that washer 30 can be placed against any portion of adjustment slot 48 in L-bracket 26 prior to inserting socket screw 34 therein. This allows a user to adjust the distance between solar panel frame 44 and roofing shingle 40 in the secured position.

To secure L-bracket 26 to roofing shingle 40, washer 30 is disposed on the bracket proximate the opening. Hex bolt 36 is inserted through washer 30, the opening in L-bracket 26, brace plate 38, roofing shingle 40 and plywood 42. This installation process is repeated for opposing ends of each rail 10. Once completed and all of the fasteners are tightened, the solar panel mounting apparatus secures solar panel 46 to roofing shingles 40.

The solar panel mounting apparatus can be secured to roofing shingles 40 by using alternative fasteners. FIGS. 8-9 depict an alternative embodiment in which rail 10 is secured to L-bracket 26 by using hex bolt 36. In this configuration, rail 10 is rotated such that second side cavity 16 and third side cavity 18 are facing L-bracket 26. Hex bolt 36 is inserted through adjustment slot 48 in L-bracket 26, washer 30 and hex nut 28. This connection eliminates the need for lock brace 22 when securing L-bracket 26 to rail 10. Rail 10 is secured to solar panel frame 44 and roofing shingle 40 in the same manner as described above.

It shall be appreciated that the components of the solar panel mounting apparatus described in several embodiments herein may comprise any alternative known materials in the field and be of any color, size and/or dimensions. It shall be appreciated that the components of the solar panel mounting apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A solar panel mounting apparatus for use in securing a frame with a solar panel stored therein to a roof of a building, the solar panel mounting apparatus comprising a non-hollow member with a lower cross-sectional profile and enhanced strength, the solar panel mounting apparatus comprising:

a rail detachably coupled to the frame and the roof, the rail comprising a cross-sectional profile comprising an upper pentagonal shaped cavity, a first rectangular shaped side cavity, a second rectangular shaped side cavity and a third trapezoidal shaped side cavity, each cavity in the upper, first side, second side and third side cavities comprising a side wall in the cross-sectional profile with a cutout disposed thereto, the side wall comprising an inner wall and an outer wall;

a first set of fasteners coupled to the frame and a portion of an inner wall of the upper cavity; and a second set of fasteners coupled to the roof and a portion of an inner wall of the first side cavity or a portion of the inner wall of the second side cavity.

2. The solar panel mounting apparatus of claim 1, further comprising a first pair of knobs disposed on the inner wall of the upper cavity and a second pair of knobs disposed on the inner wall of the first side cavity.

3. The solar panel mounting apparatus of claim 2, further comprising a first lock brace disposed within the upper cavity and coupled to the first pair of knobs and a second lock brace disposed within the first side cavity and coupled to the second pair of knobs, wherein each lock brace comprises a threaded opening.

4. The solar panel mounting apparatus of claim 3, wherein the first set of fasteners comprises a Z-bracket coupled to the frame and comprising a lower portion with a threaded opening, a first star washer disposed on the lower portion of the Z-bracket proximate the threaded opening, and a first screw disposed through the Z-bracket threaded opening, the first star washer and the threaded opening of the first lock brace.

5. The solar panel mounting apparatus of claim 4, wherein the second set of fasteners comprises a L-bracket comprising an upper portion coupled to the rail and a lower portion coupled to the roof, the upper portion further comprising an elongated slot and the lower portion comprising an opening.

6. The solar panel mounting apparatus of claim 5, wherein the second set of fasteners comprises a second washer, a third washer, a second screw and a third screw, wherein the second washer is disposed on the upper portion of the L-bracket proximate the elongated slot and the second screw is disposed through the second washer, the elongated slot of the L-bracket and the threaded opening of the second lock brace, wherein the third washer is disposed on the lower portion of the L-bracket proximate the opening and the third screw is disposed through the third washer, the opening of the L-bracket and the roof.

7. The solar panel mounting apparatus of claim 5, wherein the second set of fasteners comprises a second washer, a third washer, a nut, a second screw and a third screw, wherein the second washer is disposed on the upper portion of the L-bracket proximate the elongated slot, the nut is disposed on the second washer and the second screw is positioned within the second side cavity and disposed through the elongated slot of the L-bracket, the second washer and the nut, wherein the third washer is disposed on the lower portion of the L-bracket proximate the opening and the third screw is disposed through the third washer, the opening of the L-bracket and the roof.

* * * * *